United States Patent
Max

(10) Patent No.: US 9,885,443 B2
(45) Date of Patent: Feb. 6, 2018

(54) INTERRETRACTABLE FOLDING PIANO STAND

(71) Applicant: David Michael Max, Shadow Hills, CA (US)

(72) Inventor: David Michael Max, Shadow Hills, CA (US)

(73) Assignee: H56 Inc., Santa Monica, CA (US)

( * ) Notice: Subject to any disclaimer, the term of this patent is extended or adjusted under 35 U.S.C. 154(b) by 0 days.

(21) Appl. No.: 15/340,961

(22) Filed: Nov. 1, 2016

(65) Prior Publication Data

US 2017/0114947 A1 Apr. 27, 2017

Related U.S. Application Data

(63) Continuation-in-part of application No. 14/081,820, filed as application No. PCT/US2012/041025 on Jun. 6, 2012, now Pat. No. 9,797,545.

(60) Provisional application No. 61/493,678, filed on Jun. 6, 2011.

(51) Int. Cl.

| A47B 97/04 | (2006.01) |
|---|---|
| F16M 11/38 | (2006.01) |
| A47B 97/08 | (2006.01) |
| A47B 23/04 | (2006.01) |
| G10G 5/00 | (2006.01) |
| G10H 1/32 | (2006.01) |

(52) U.S. Cl.
CPC .......... *F16M 11/38* (2013.01); *A47B 23/044* (2013.01); *A47B 97/08* (2013.01); *G10G 5/00* (2013.01); *G10H 1/32* (2013.01)

(58) Field of Classification Search
CPC ........ F16M 11/38; F16M 11/041; G10G 5/00; A47B 23/043
USPC .................................. 248/443; 84/327, 329
See application file for complete search history.

(56) References Cited

U.S. PATENT DOCUMENTS

| 7,514,616 B2 * | 4/2009 | Sawhney | G10G 5/00 |
| | | | 248/443 |
| 9,010,700 B1 * | 4/2015 | Cooper | F16M 11/38 |
| | | | 248/166 |

* cited by examiner

*Primary Examiner* — Todd M Epps
(74) *Attorney, Agent, or Firm* — Sean D. Burdick

(57) ABSTRACT

An interretractable folding stand includes outer, inner, and top pairs of mirror-image members. Each outer member is rotatably connected to an inner member and to a top member. Inner members are connected by a first hinge, and top members are connected by a second hinge, so that when inner and top members are fully rotatably misaligned with respect to the outer pair, the first and second hinges can be opened to allow the inner and outer members to form a tripod. When open, inner members can engage top members to support the top members in an elevated horizontal plane to provide a stable surface for supporting an elongated structure or instrument such as an electric piano. When closed, outer members align in parallel to form a retracting channel for the inner and top members.

20 Claims, 19 Drawing Sheets

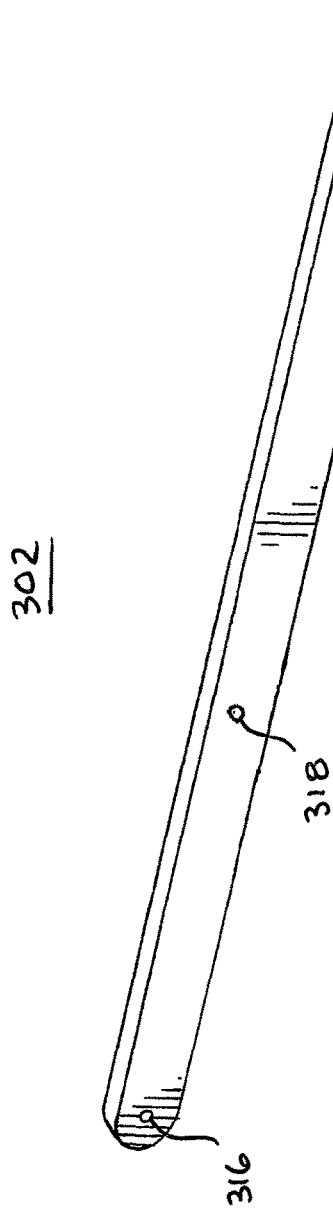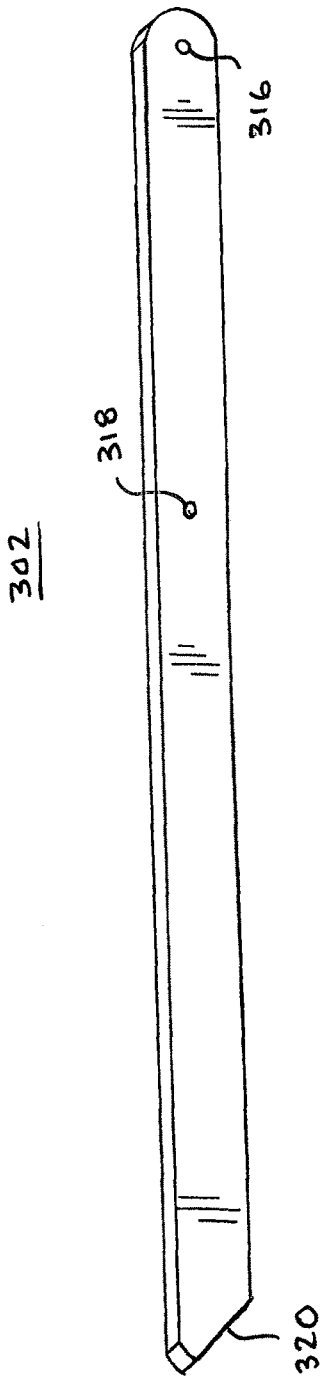
FIG. 16
FIG. 17

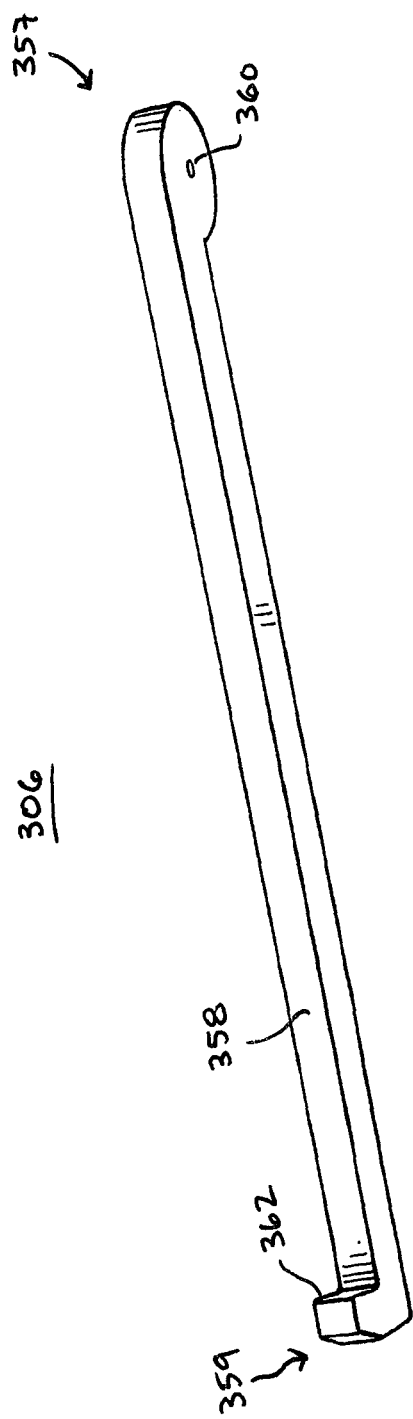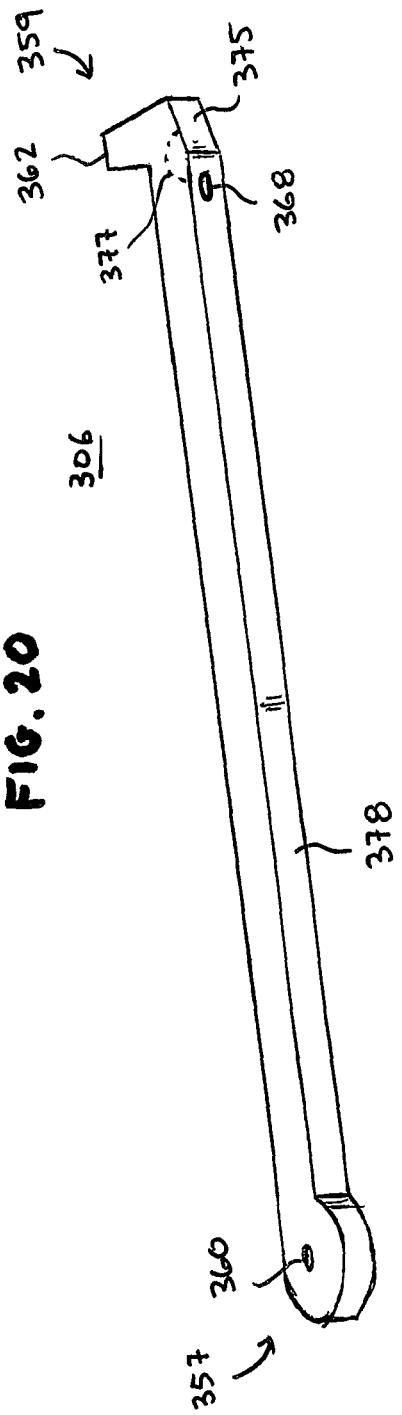
FIG. 20
FIG. 21

US 9,885,443 B2

INTERRETRACTABLE FOLDING PIANO STAND

This application is a continuation-in-part of U.S. patent application Ser. No. 14/081,820 which was filed Nov. 15, 2013, and which is fully incorporated herein by reference.

BACKGROUND OF THE INVENTION

Field of the Invention

The present invention relates to mechanical stands for supporting or displaying objects such as musical instruments, canvases, books, and signage. More specifically, the invention relates to such a stand having interretractable folding parts.

Description of the Related Art

Mechanical stands for supporting objects come in a wide variety of sizes, shapes, and materials. The design of the stand typically depends on the object, or class of objects, being supported. Stand designs continue to evolve along with the design of supportable objects.

The problem being solved by the present invention is that of constructing a general purpose collapsible stand that when fully expanded provides a high degree of stability for supporting or displaying objects and that when fully collapsed occupies a minimal size for easy carrying and storage.

SUMMARY OF THE INVENTION

The present invention provides an elegantly mechanically engineered design for meeting the above objectives. An interretractable folding stand according to the invention includes outer, inner, and top pairs of mirror-image members. Each member of the outer pair is rotatably connected to a member of the inner pair and to a member of the top pair. The members of the inner pair are hingedly connected by a first hinge, and the members of the top pair are hingedly connected by a second hinge, so that when the inner pair is fully rotatably misaligned with respect to the outer pair and when the top pair is fully rotatably misaligned with respect to the outer pair, the first and second hinges align along a common axis and thereby allow the outer, inner, and top pairs to be hingedly separated to an open position. In the open position, the members of the outer pair form two feet of a tripod, and the members of the inner pair form a third foot of the tripod. In the closed position, the members of the outer pair align in parallel, and are offset to form a channel for enclosing the inner pair and top pair. The inner pair and top pair, when fully rotatably aligned with respect to the outer pair, both rest within the channel between members of the outer pair in a closed position. Each inner member may be configured to accommodate overlap of a top member for spatially efficient retraction of the inner and top members within the volume of the channel.

A means for engaging an inner member to a top member is also provided. The engaging means may connect a top end of the inner member in its fully extracted position to the lower end of a top member in its fully extracted position, so that when the stand is hinged to an open position, the top members, supported by the inner and outer members, lie in an elevated horizontal plane. In this position, the top members provide a stable surface for supporting an elongated structure or instrument such as an electric piano. The tripod feet are configured with flat, angled contact surfaces to ensure horizontal deployment of the top members. Each top member may be configured with a means for manually extracting a top member from the channel, such as a stop or finger hole. The stop also prevents movement of a load supported on the top members.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

FIG. 16 is a right side perspective view of an outer member of the embodiment of FIG. 9.

FIG. 17 is a left side perspective view of an outer member of the embodiment of FIG. FIG.9.

FIG. 20 is a right side perspective view of a top member of the embodiment of FIG. 9.

FIG. 21 is a left side perspective view of a top member of the embodiment of FIG. 9.

DETAILED DESCRIPTION

Generally speaking, the present invention for an interretractable folding stand utilizes a design that can be applied to many types of utility stands, including easels, book stands, computer stands, music stands, musical instrument stands, poster stands, and similar apparatus. The design may also be used in furniture such as chairs. The design uses flat stock materials cut into shapes that stack together in multiple layers. In one embodiment, the outer layers, or outer members, are formed in an angular shape, similar to a boomerang. When the outer members are closed together, they house the interior parts, for example, a pair of inner members or a pair of top members, or both types of pairs. When the stand is fully open, the outer members serve as a backrest and provide two feet of a tripod, the inner members serve as a carriage and provide the third foot of the tripod, and the top members (if present) serve as a head stock or back rest extension. The interior parts are attached to the outer members via pins or roll-over rivets allowing the parts to rotate with respect to the outer members. The outer members are hinged at near the top, or the top members (if present) are instead hinged together at one end opposite the riveted end where they connect to the outer members, allowing the top members to spread the outer members apart when open. To open, the inner members are rotated outside of the outer members, and only when all hinges are properly aligned is the stand able to be spread into the fully open, or standing position. Advantages of the design are its compact size when fully closed and its elegant and aesthetically pleasing stance when fully open. Alternative applications of the design include additional swivel elements such as arms for a chair, flip-out page holders for a cook book stand, and hooked arms for providing better stability for items supported on the carriage.

The term "interretractable" as used herein denotes an apparatus comprising multiple components that are retractable "among themselves". To further illuminate this definition, consider a conventional apparatus having a retractable feature, such as a telescope or an electrical appliance (e.g., a vacuum cleaner or an iron) equipped with a retractable power cord. The inner cylinders of the telescope may retract within the outer cylinder, but the outer cylinder itself does not retract or collapse. Similarly, the cord when played out is retractable within the chassis of the appliance; however, the chassis itself is not retractable and does not fold or collapse. In contrast, an interretractable apparatus comprises one or more parts that may be retracted within other parts of the apparatus that fold or collapse into a smaller space to accommodate the one or more retracted parts.

Figure 1:
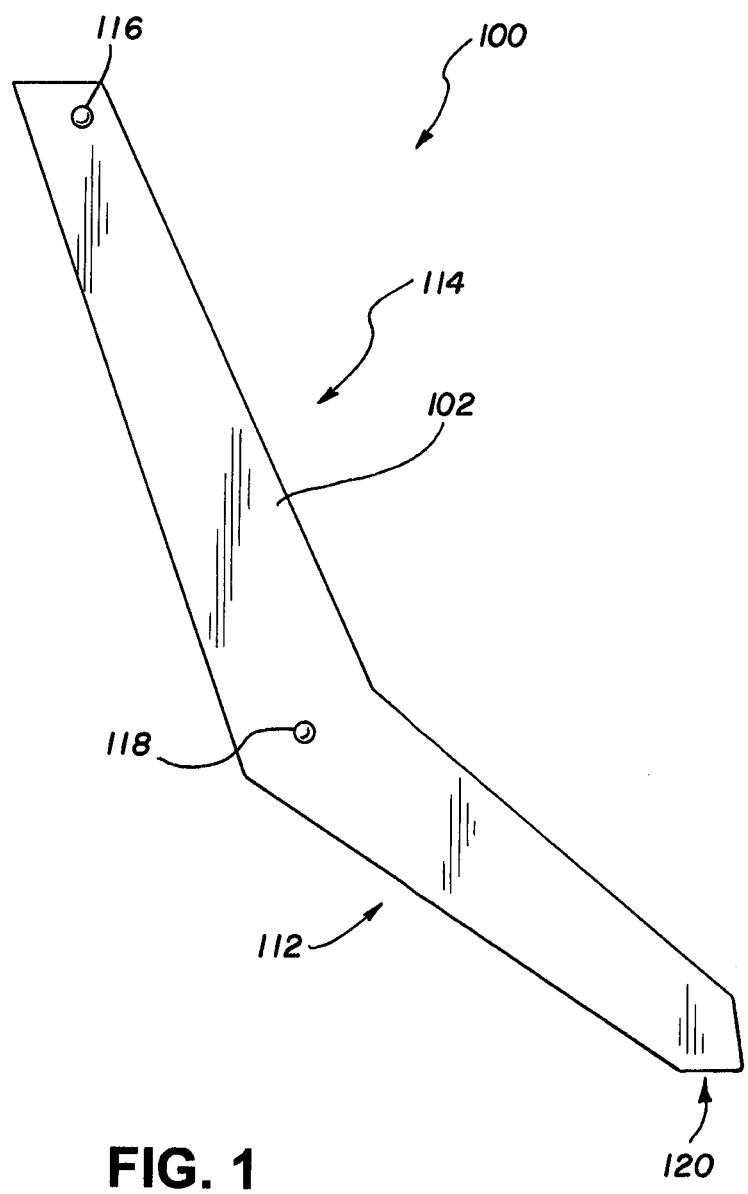
FIG. 1 is a side view of one embodiment of an interretractable folding stand according to the invention, showing the stand in a fully closed or fully retracted position.

An example of an interretractable folding stand according to the invention that illustrates this property is shown in FIGS. 1 through 6. In FIG. 1, the stand is fully closed or retracted and in FIG. 6, the stand is fully open. Notice that in the fully open position in FIG. 6, the stand does not present a chassis or cavity into which any of its parts may be retracted. As shown in the intervening figures, the parts may be collapsed into the fully closed position of FIG. 1 through a succession of manipulations of the parts of the stand, consisting or simple rotational or folding movements. In the fully closed position the outer members come together to form a channel into which the interior parts may be retracted, much like the blades of a pocket knife are retracted within the handle of the knife.

A first embodiment of an interretractable folding stand is shown in FIGS. 1 through 6. The figures also show manufacturing details of the individual components parts, i.e., the outer, inner and top members. This embodiment is well-suited to serve, for example, as an easel or as a stand for a musical instrument such as a guitar.

FIG. 1 is a side view of one embodiment of an interretractable folding stand 100 according to the invention. Stand 100 is shown here in a fully closed or fully retracted position. Because other parts of the stand 100 are retracted and rotatably aligned to an outer member 102, only the outer side of the outer member 102 can be seen in this view. Outer member 102 is an angled member formed preferably from flat stock, and having a leg portion 112 extending at an obtuse angle from a spine portion 114. The inner surface of the spine portion 114 may serve as a backrest, as will be illustrated in more depth hereafter.

Near the top end of the spine portion 114, outer member 102 may define a hole 116, for accommodating a pin or rivet, to enable the outer member to be rotatably connected to a top member. Near the junction of the leg 112 and the spine 114, the outer member 102 may define another hole 118 for accommodating a similar pin or rivet, to enable the outer member to be rotatably connected to an inner member. At the base of the leg portion 112, the outer member 102 may terminate in a flat foot portion 120. As will be seen, the foot portion 120 forms the foot of a tripod when the stand 100 is extracted and folded to the fully open position.

Figure 2:
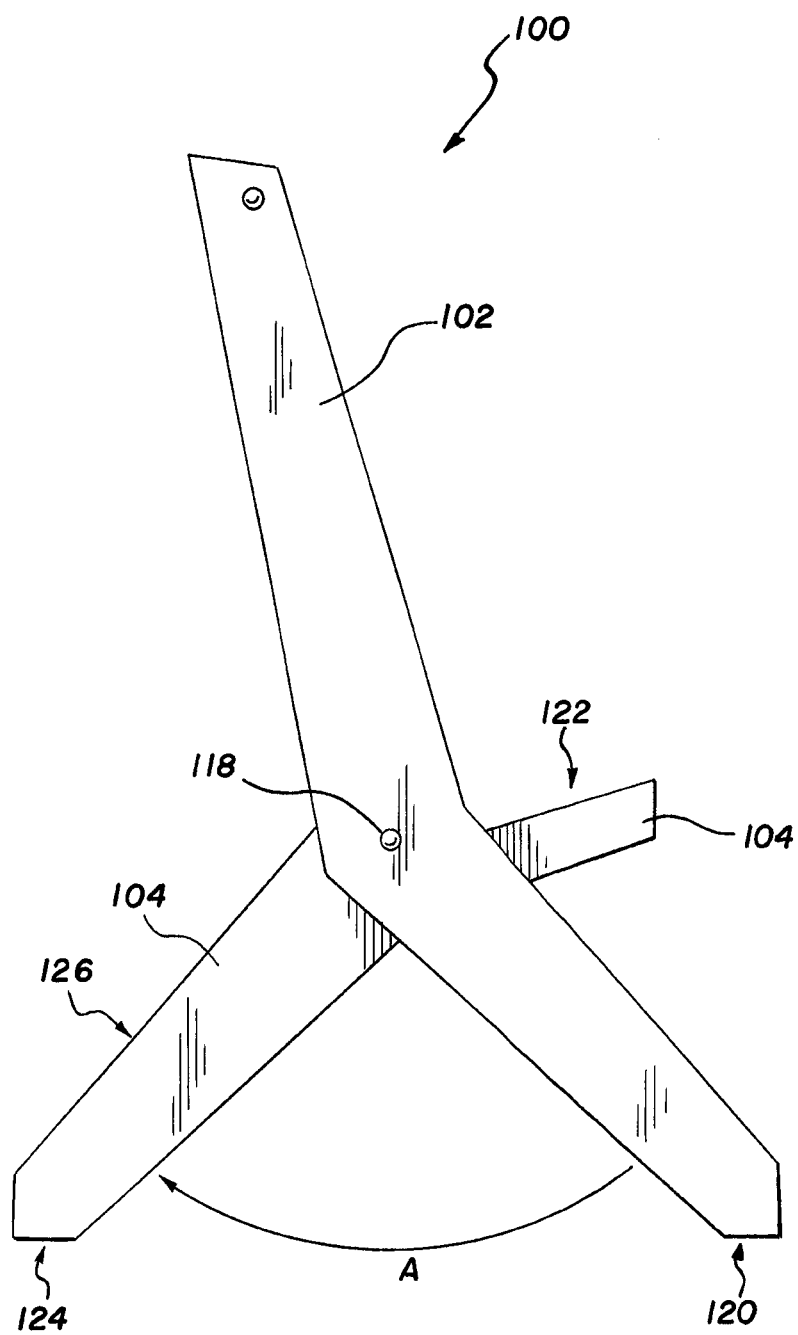
FIG. 2 is a side view of the interretractable folding stand of FIG. 1, showing an inner member rotatable misaligned with respect to an outer member.

FIG. 2 is a side view of the interretractable folding stand 100. This view shows an inner member 104 rotatable misaligned with respect to the outer member 102. The inner member 104 includes an arm portion 122 and a leg portion 126 that extends at an obtuse angle from the arm portion 122, as shown. The arm portion 122 forms a carriage for supporting objects resting on the stand.

To achieve the misalignment shown in FIG. 2, the inner member 104 is rotated from the closed or retracted position shown in FIG. 1 about the pivot point coincident with hole 118. Accordingly, through this movement the leg portion 126 of the inner member 104 will rotate with respect to the outer member 102 in the direction indicated at A. When inner member 104 is fully rotated in direction A, a flat foot portion 124 of the inner member 104 rests approximately in the same horizontal plane as the flat foot portion 120 of the outer member 102. These foot portions form two of three feet of a tripod that support the stand 100.

Figure 3:
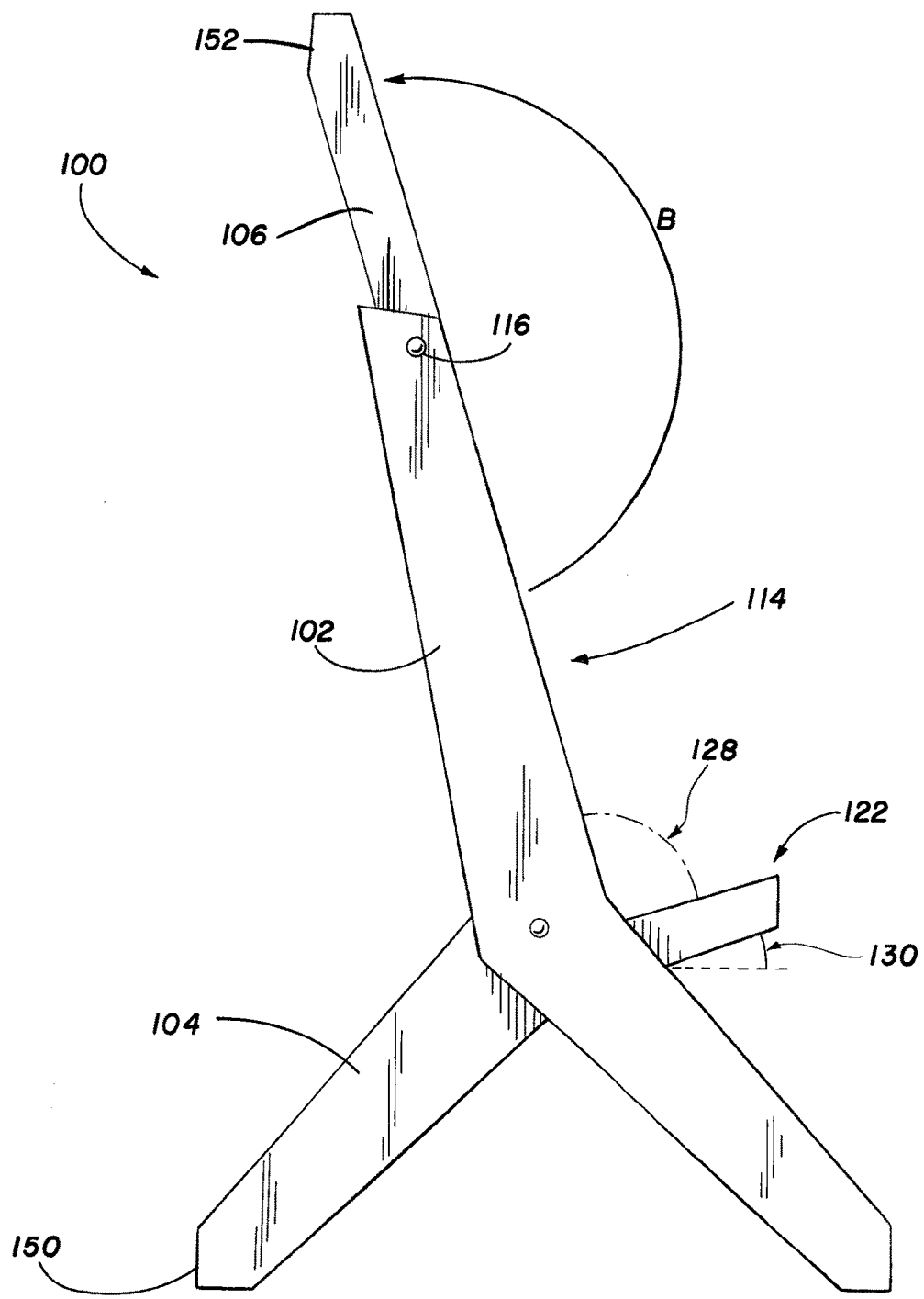
FIG. 3 is a side view of the interretractable folding stand of FIG. 1, showing a top member rotated to a fully extracted position.

FIG. 3 is another side view of the interretractable folding stand 100. This view shows a top member 106 rotated from the closed or retracted position shown in FIG. 1 about the pivot point coincident with hole 116 in the direction B to a fully extracted position. In the fully extracted position, top member 106 aligns with the spine portion of outer member 102 to form an extension of the backrest portion of the stand, as shown.

Also in the fully extracted position, the arm portion 122 of the inner member 104 forms an angle 128 with respect to the backrest (i.e. the spine portion 114) between about 90 degrees and about 120 degrees. In one embodiment, this angle may be set to about 105 degrees. Also in this position, the arm portion 122 forms an angle 130 with respect to the horizontal between about 10 degrees and about 30 degrees. In one embodiment, this angle may be set to about 20 degrees. Accordingly, in this position the backrest may form an angle with respect to the horizontal between about 60 degrees and about 150 degrees. In one embodiment, this angle may be set to about 105 degrees.

Herein, the term "about" when used to approximate dimensions such as angles is intended to allow for a reasonable amount of tolerance or variation in design without departing from the essence of the invention. Mathematical exactness in describing dimensions of the constituent parts of an interretractable stand is not required, so long as the functional operation of the interretractable stand is achieved.

Figure 4:
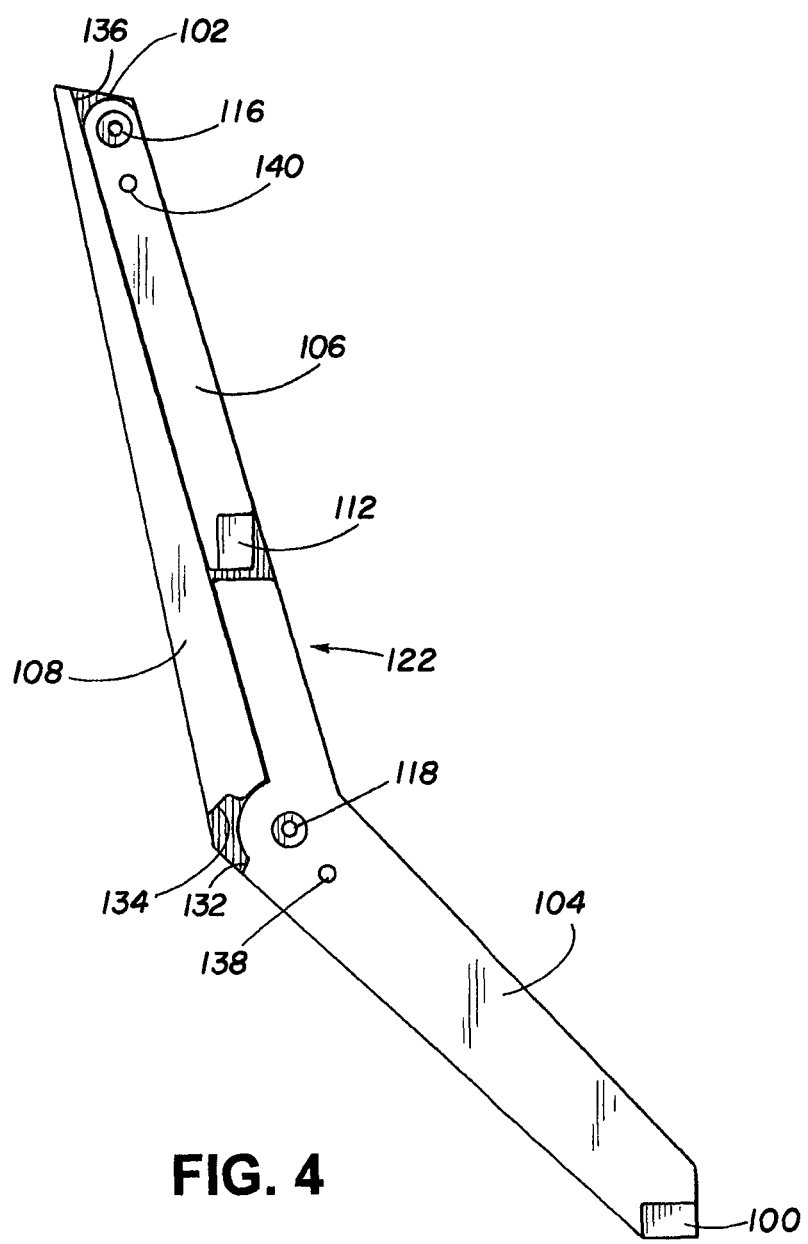
FIG. 4 is a cutaway side view of the interretractable folding stand of FIG. 1, showing a single outer member, a single inner member, and a single top member in a closed position in which the inner member and the top member are aligned with the outer member.

FIG. 4 is a cutaway side view of the interretractable folding stand 100. This view shows a single outer member 102, a single inner member 104, and a single top member 106, all oriented in a closed position in which the inner member 104 and the top member 106 are aligned with the outer member. Thus, FIG. 4 shows one half of the stand 100, such that the missing half is a mirror-image of the half that is shown.

In this view, several important functional elements of the stand 100 are shown. The outer member 102 includes a shelf 108 that protrudes out of the page. The shelf 108 arrests rotation, in both rotational directions, of both the inner member 104 and the top member 106.

Consider first the inner member 104. When rotated counterclockwise into the fully closed position, as shown, the arm portion 122 abuts the shelf 108 and thus the shelf limits the counterclockwise rotation of the inner member. When the inner member is rotated in a clockwise direction, a notch 132 formed in the inner member near the pivot point 118 engages a cooperating notch 134 formed in a lower end of the shelf 108. This engagement occurs when the inner member 104 is rotated to the fully misaligned or fully open position, and thus the shelf 108 also limits clockwise rotation of the inner member with respect to the outer member.

Now consider the top member 106. When rotated clockwise into the fully closed position, as shown, one side of the top member 106 abuts the shelf 108 and thus the shelf limits the clockwise rotation of the top member. When the top member is rotated in a counterclockwise direction, the top end 136 of the shelf 108 abuts an opposite side of the top member 106 and thereby limits any further rotation of the top member beyond about 180 degrees from its fully closed position.

FIG. 4 also shows rectangular cutouts 110 and 112. Cutout 110 is formed at the foot of inner member 104, and cutout 112 is formed at the top of the top member 106. These cutouts each provide a recessed mounting surface for half of a hinge bracket. In each case, the mounting surface may be recessed so that when a hinge is installed, the hinge bracket will not protrude beyond the width of the member to which it is connected. This ensures that the members can be folded and rotated to achieve the desired open and closed positions without interference.

Alignment holes are also shown. In this embodiment, alignment holes 138 and 140 may be defined in any convenient location along the side of the inner member 104 and along the side of the top member 106, respectively. These holes are optional, and various embodiments of interretractable folding stands according to the invention may include any number of such holes. A dowel or pin 148 (FIG. 6) is anchored within one of a complimentary pair of opposing alignment holes, so that when pairs of inner or top members are folded to the closed position, the dowel guides the members into proper alignment by engaging the opposite alignment hole.

Figure 5:
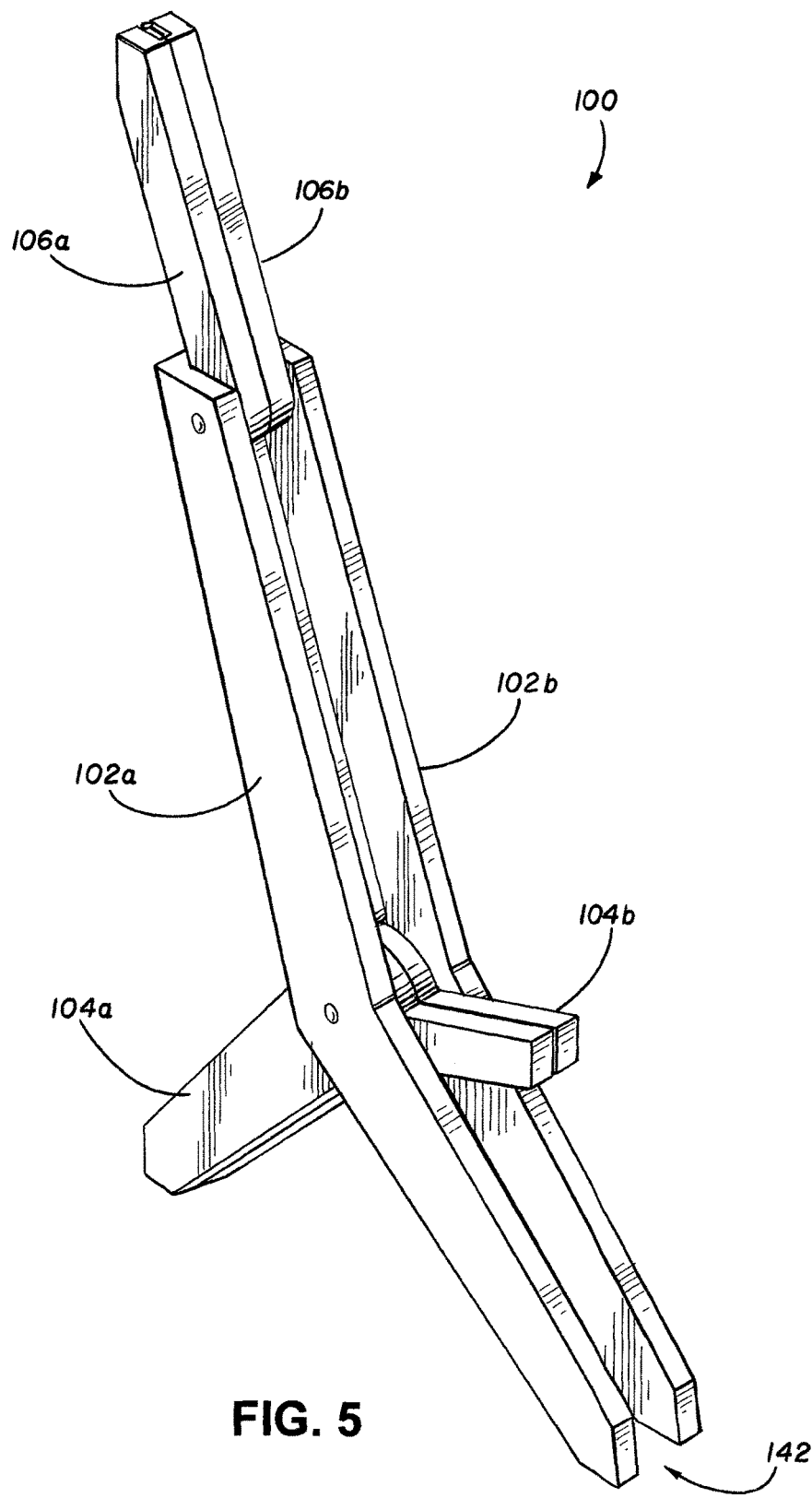
FIG. 5 is a perspective view of the interretractable folding stand of FIG. 1, showing the stand in an extracted position, with an inner member pair rotatably misaligned with respect to an outer member pair, and with a top member pair fully extracted.

FIG. 5 is a perspective view of the interretractable folding stand 100. This view shows the stand in an extracted position, with an inner member pair 104a, 104b rotatably misaligned with respect to an outer member pair 102a, 102b and with a top member pair 106a, 106b fully extracted. In the extracted position as shown, or in the fully closed (retracted) position, the outer member pair 102a, 102b form a channel 142 that is sized to at least partially enclose and snugly accommodate the inner and top member pairs. This sizing may be achieved by each shelf 108 having a width approximately equal to the width of an inner member or a top member.

With the inner member pair 104a, 104b fully rotatably misaligned with respect to the outer member pair 102a, 102b, as shown, and with the top member pair 106a, 106b fully extracted, as shown, the interretractable stand 100 is in a position that permits the mirror-image members to be hingedly separated so that the stand may be manipulated to the fully open position. As will be apparent in the next figure, unless the stand 100 is fully extracted, and the upper and lower hinges properly aligned, the hinges will not cooperate to allow the stand to be opened.

Figure 6:
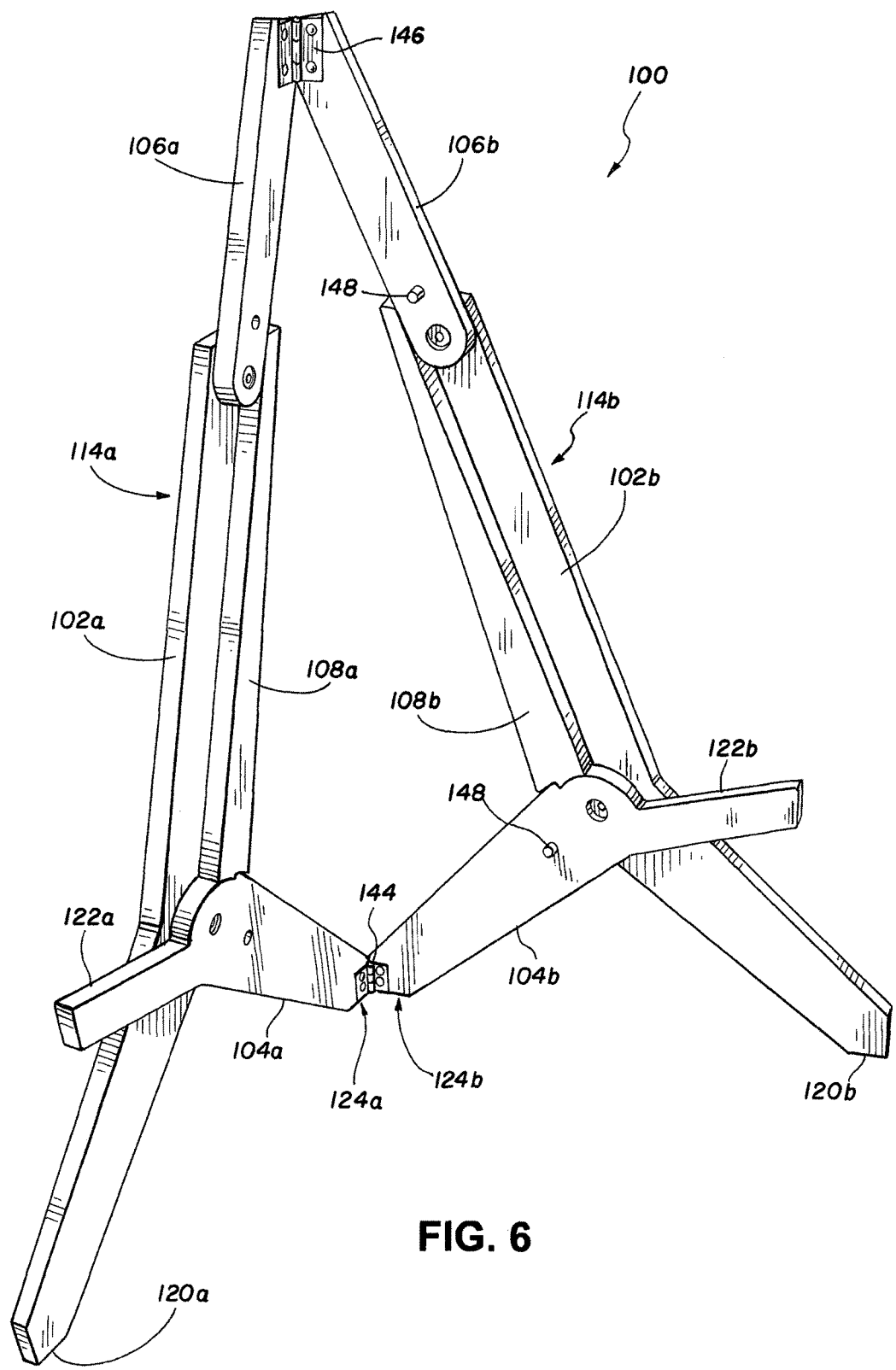
FIG. 6 is a perspective view of the interretractable folding stand of FIG. 1, showing the stand in a fully open position, with inner, outer, and top pairs hingedly separated.

FIG. 6 is a perspective view of the interretractable folding stand 100. This view shows the complete stand in a fully open position, with the inner (104a, 104b), outer (102a, 102b), and top (106a, 106b) member pairs each hingedly separated. In this position, the stand 100 may bear a load that rests on the carriage formed by arms 122a, 122b and against the backrest formed by spine portions 114a, 114b and top members 106a, 106b. A stable tripod configuration is formed by first foot 120a, second foot 120b, and a third foot formed by the combination of feet 124a and 124b.

The inner members 104a, 104b are hingedly connected by a lower hinge 144 that attaches near the feet 124a and 124b. On each of these members, a mating surface 150 (FIG. 3) limits the span of rotational separation of member 104a from member 104b, by interference against an opposing mating surface 150. Similarly, the top members 106a, 106b are hingedly connected by an upper hinge 146 that attaches near the top of the top members, as shown. On each of these top members, a mating surface 152 (FIG. 3) limits the span of rotational separation of member 106a from member 106b, by interference against an opposing mating surface 152.

According to the invention, in all hingedly separated positions that span from the fully retracted position to the fully open position, the axes of the upper and lower hinges are substantially aligned and therefore operable to allow the members to be hingedly separated. When hingedly separated to an open position, the opposing rotational axes 116 and the opposing rotational axes 118 become misaligned, and this prevents the top members from rotating with respect to the outer members and prevents the inner members from rotating with respect to the outer members. From the extracted position, once the inner members or top members are rotated about 116 or 118 toward the retracted position, the hinges become misaligned and cannot operate.

In operation, therefore, starting with the stand in the fully retracted position, a user must first rotate the top and inner members to the fully extracted position to align the hinges, and then fold the members outward to achieve the fully open position and form the tripod. To collapse the stand, the same procedure is followed in reverse.

Figure 7:
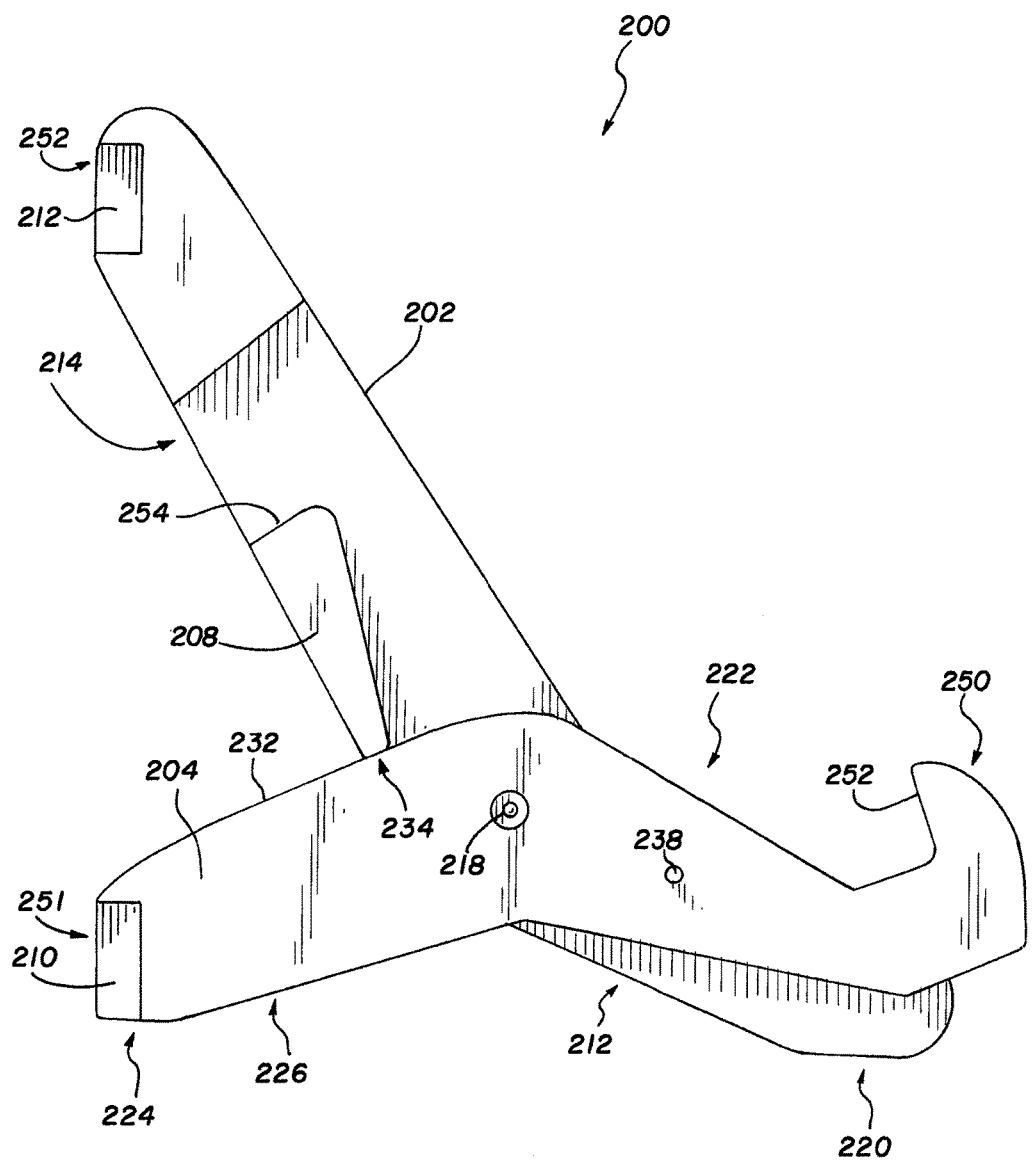
FIG. 7 is a cutaway side view of another embodiment of an interretractable folding stand according to the invention, showing a single inner member rotatably misaligned with respect to a single outer member.
Figure 8:
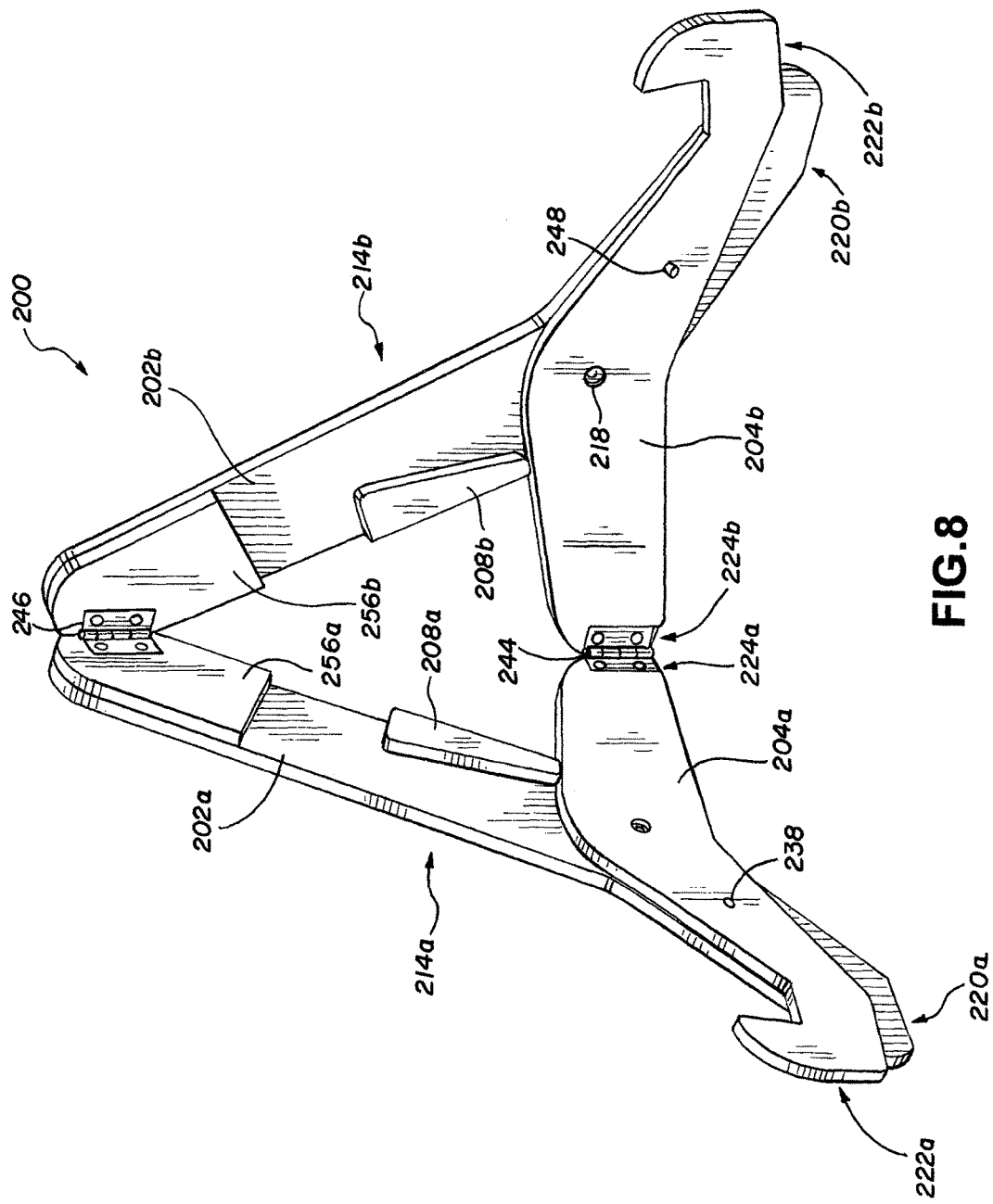
FIG. 8 is a perspective view of the interretractable folding stand of FIG. 7, shown in a fully open position.

FIGS. 7 and 8 illustrate a second embodiment of an interretractable folding stand according to the invention. These figures show examples of manufacturing details of individual components parts for a more basic embodiment in which the top members have been eliminated, and in which the main structural parts of the stand 200 comprise only an inner member pair and an outer member pair. This embodiment is well-suited to serve as a stand for supporting iPads, small canvases, signs, or books.

FIG. 7 is a cutaway side view of the second embodiment of an interretractable folding stand 200. This view shows a single inner member 204 rotatably misaligned with respect to a single outer member 202, which together form one mirror-image half of the stand 200. The design and operation is similar to stand 100.

The outer member 202 includes a leg portion 212 and a spine portion 214 that extends from and forms an obtuse angle with respect to the leg portion 212. A flat foot portion 220 is formed at the lower end of the leg portion 212. The inner member 204 includes a leg portion 226 and an arm portion 222 that extends from and fors an obtuse angle with respect to the leg portion 226. A flat foot portion 224 is formed at the lower end of leg portion 226. The inner member 204 also includes a hook 250 formed at the end of arm 222, to provide a more secure means for retaining a load on the stand, to prevent slippage of an item such as an iPad, to maintain open the pages of a book, etc.

A shelf 208 on the outer member 202 protrudes from the page and is configured to limit rotation of the inner member 204 in both of two opposite rotational directions. In the position shown, the inner member 204 is fully rotated to the extracted position, or to the open position, depending on whether member pairs are, respectively, folded closed or folded open. In this position, the upper edge 232 of the leg portion 226 abuts the lower edge 234 of the shelf 208 at the counterclockwise rotational limit.

In the closed position (not shown), the inner member 204 is rotated clockwise to the opposite rotational limit. That limit is reached when edge 252 of hook 250 comes into contact with the upper edge 254 of shelf 208. The inner member 204 reaches either limit by rotating about the pivot point 218, which is a hole defined in the inner member that is sized to accommodate a pin or rivet that rotationally connects the inner member 204 to the outer member 202. A second hole 238 defined in the inner member 204 may be provided as an alignment hole which cooperates with a dowel 248 to guide and engage inner member pairs when the stand 200 is folded from the open position to the extracted position.

A hinge recess 210 is formed at the lower end of leg 226 on the inner member 202. Another hinge recess is formed at the upper end of spine portion 214 of the outer member 202. The hinge recesses are sized to accommodate hinge brackets so that the brackets, when installed, do not protrude from the width of an inner or outer member.

FIG. 8 is a perspective view of the interretractable folding stand 200. This view shows the complete stand 200 in a fully open position with inner (204a, 204b) and outer (202a, 202b) member pairs each hingedly separated. In this position, the stand 200 may bear a load that rests on the carriage formed by arms 222a, 222b and against the backrest formed by spine portions 214a, 214b. A stable tripod configuration is formed by first foot 220a, second foot 220b, and a third foot formed by the combination of feet 224a and 224b. The stand may be designed to achieve various desired angles of functional significance, to customize the stand for a particular load. For example, the angle of the backrest with respect to the horizontal, the angle of the backrest with respect to the arm, the angle of the arm with respect to the horizontal, and the angle of the leg with respect to the horizontal, may be adjusted in the design without departing from the salient features of the invention.

The inner members 204a, 204b are hingedly connected by a lower hinge 244 that attaches near the feet 224a and 224b. Similarly, the outer members 202a, 202b are hingedly connected by an upper hinge 146 that attaches near the top of the top members, as shown. On each of these top members, a mating surface 152 (FIG. 3) limits the span of rotational separation of member 106a from member 106b, by interference against an opposing mating surface 152. According to the invention, in all hingedly separated positions that span from the fully retracted position to the fully open position, the axes of the upper and lower hinges are substantially aligned.

The inner members 204a, 204b are hingedly connected by a lower hinge 244 that attaches near the feet 224a and 224b. On each of these members, a mating surface 250 (FIG. 7) limits the span of rotational separation of member 204a from member 204b, by interference against an opposing mating surface 250. Similarly, the outer members 202a, 202b are hingedly connected by an upper hinge 246 that attaches near the top of the spine portions, as shown. At the top end of each of these spines, a mating surface 252 (FIG. 7) limits the span of rotational separation of member 202a from member 202b, by interference against an opposing mating surface 252. According to the invention, in all hingedly separated positions that span from the fully retracted position to the fully open position, the axes of the upper and lower hinges are substantially aligned.

Stand 200 operates in similar fashion as stand 100. Starting with the stand in the fully retracted position, a user must first rotate the inner members to the fully rotatably misaligned (or fully extracted) position to align the hinges, and then fold the inner and outer members outward to achieve the fully open position and form the tripod. To collapse the stand, the same procedure is followed in reverse. According to the invention, in the closed position the inner members may be rotated with respect to the outer members, but the hinges will not operate. When the inner members are rotated to the fully extracted position, the hinges align to allow the members to be folded open. When the members are folded to the open position to form the tripod, the inner members cannot be rotated with respect to the outer members. This advantageously provides a highly stable yet collapsible stand design.

FIG. 8 also shows the alignment hole 238 and its counterpart dowel 248 that cooperate to align the inner members when hingedly folded from the open position to the extracted position. In the extracted position, the outer members 202a, 202b are in contact with one another as shelves 208a and 208b abut one another and as spacers 256a and 256b abut one another. This creates a channel in the space adjacent to the shelves and between the shelves and spacers, which has a width approximately equal to the width of the inner members. In the extracted position, the channel provides sufficient space for the inner members to be rotated into the channel to achieve the fully closed (or fully retracted) position.

A skilled artisan will appreciate that in one preferred embodiment, the widths of the spacers, shelves and inner members are all approximately equal. These parts may therefore advantageously be machined from the same planar stock material. In another embodiment, the spacer and shelf are integral to the outer member, and formed, e.g. by a machining process, to have approximately the same width as the inner member.

In the foregoing embodiments, the various members of the interretractable folding stand are preferably formed from solid planks of a hardwood. The type of hardwood is preferably chosen for its aesthetic grain pattern, color, and strength. Examples of appropriate hardwoods include ash, cherry, hickory, koa, mahogany, maple, oak, walnut, and wenge. The members of an interretractable stand may also be formed from other materials such as metals and plastics, which should be selected for appropriate hardness and rigidity, depending on the intended end use. Other materials that make up the stand, such as hinges, rivets, and dowels, may be selected from conventional hardware stock.

Other embodiments according to the invention are possible. For example, the principles of the invention may be applied to the construction of a folding chair. The chair may include a seat made from canvas or from some other sturdy fabric for attachment to the arms of the inner members. The chair may also include a second such fabric for attachment to the backrests of the outer members for forming a chair back.

In another embodiment of the invention, an interretractable folding stand 300 provides a raised horizontal shelf for supporting an elongated structure or instrument such as an electric piano. Various views of one such embodiment and components thereof are shown throughout FIGS. 9 to 21. Like the embodiment of stand 100, stand 300 comprises a mirror-image outer member pair 302a and 302b, a mirror-image inner member pair 304a and 304b, and a mirror image top member pair 306a and 306b. These three sets of member pairs are rotatably or hingedly interconnected in an arrangement similar to that shown and described for stand 100.

Figure 9:
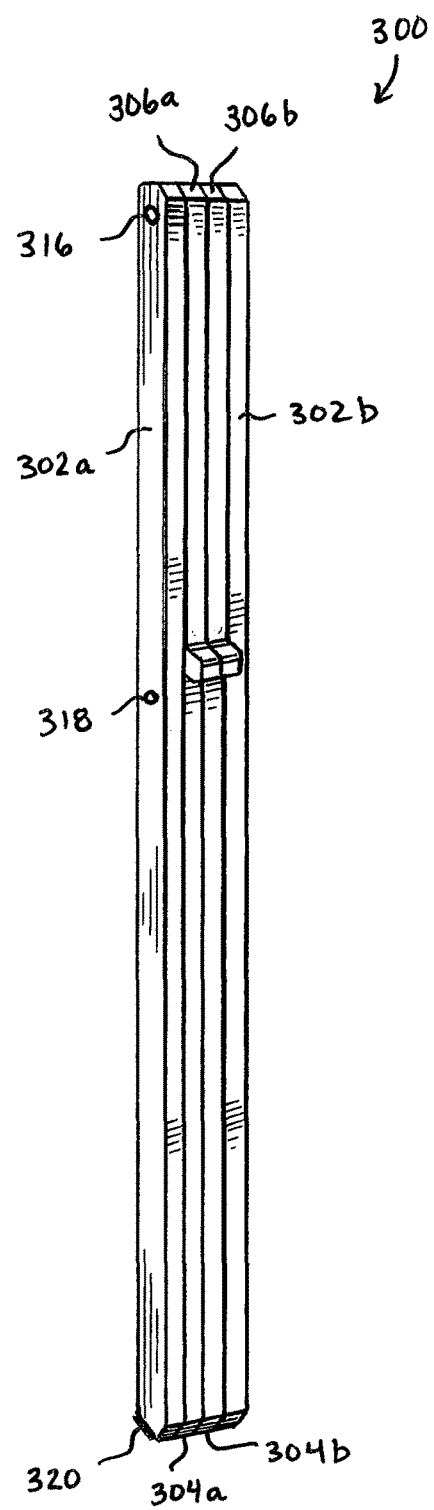
FIG. 9 is a perspective view of another embodiment of an interretractable folding stand according to the invention shown in a fully retracted position, and configured to provide a raised horizontal shelf for supporting an elongated structure or instrument such as an electric piano.

In FIG. 9, stand 300 is shown in perspective in a fully closed or fully retracted position. That is, the inner member pairs 304a, 304b and the top member pairs 306a, 306b are rotatably aligned with respect to the outer members 302a, 302b, and retracted within a channel formed between outer member 302a and outer member 302b. Outer member 302a, 302b may be a substantially linear member formed preferably from flat stock. Near its top end, outer member 302a, 302b may define a hole 316 for accommodating a pin or rivet, to enable the outer member to be rotatably connected to a respective top member 304a, 304b. About midway between its top and bottom ends, the outer member 302a, 302b may define another hole 318 for accommodating a similar pin or rivet, to enable the outer member to be rotatably connected to a respective inner member 306a, 306b. At its base or bottom end, the outer member 302a, 302b may terminate in a flat foot portion 320. As will be seen, the foot portion 320 forms one foot of a tripod when the stand 300 is extracted and folded to the fully open position.

Figure 13:
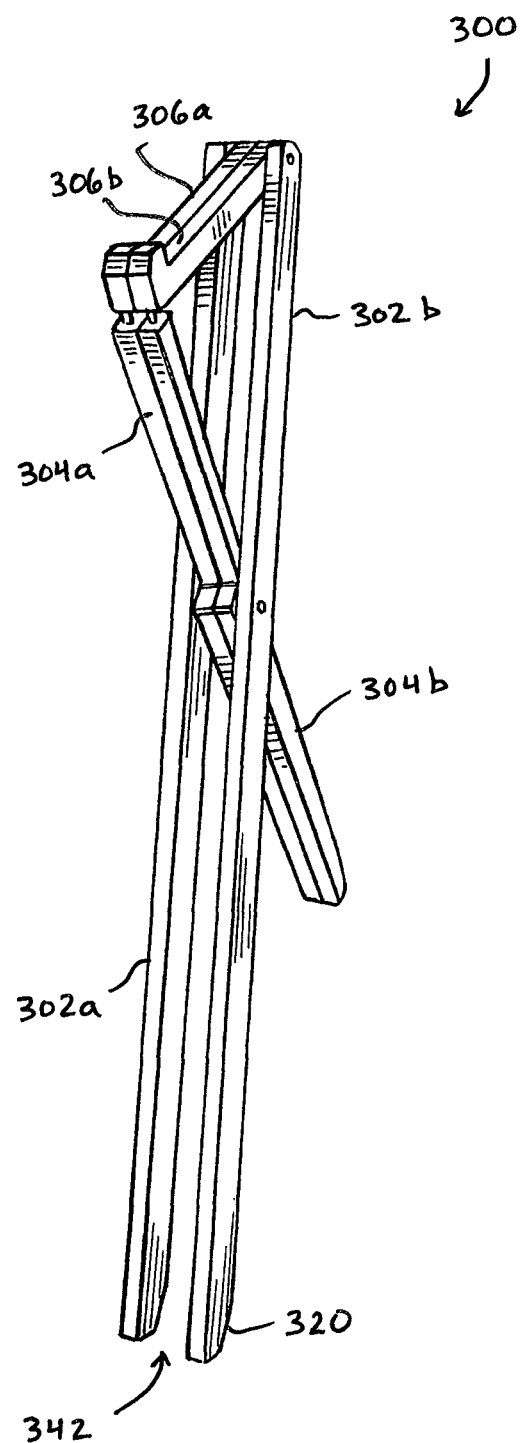
FIG. 13 is another perspective view of the embodiment of FIG. 9, showing top members fully rotatably misaligned with respect to outer members, and the inner members fully rotatably misaligned with respect to outer members and being engaged to the top members.
Figure 14:
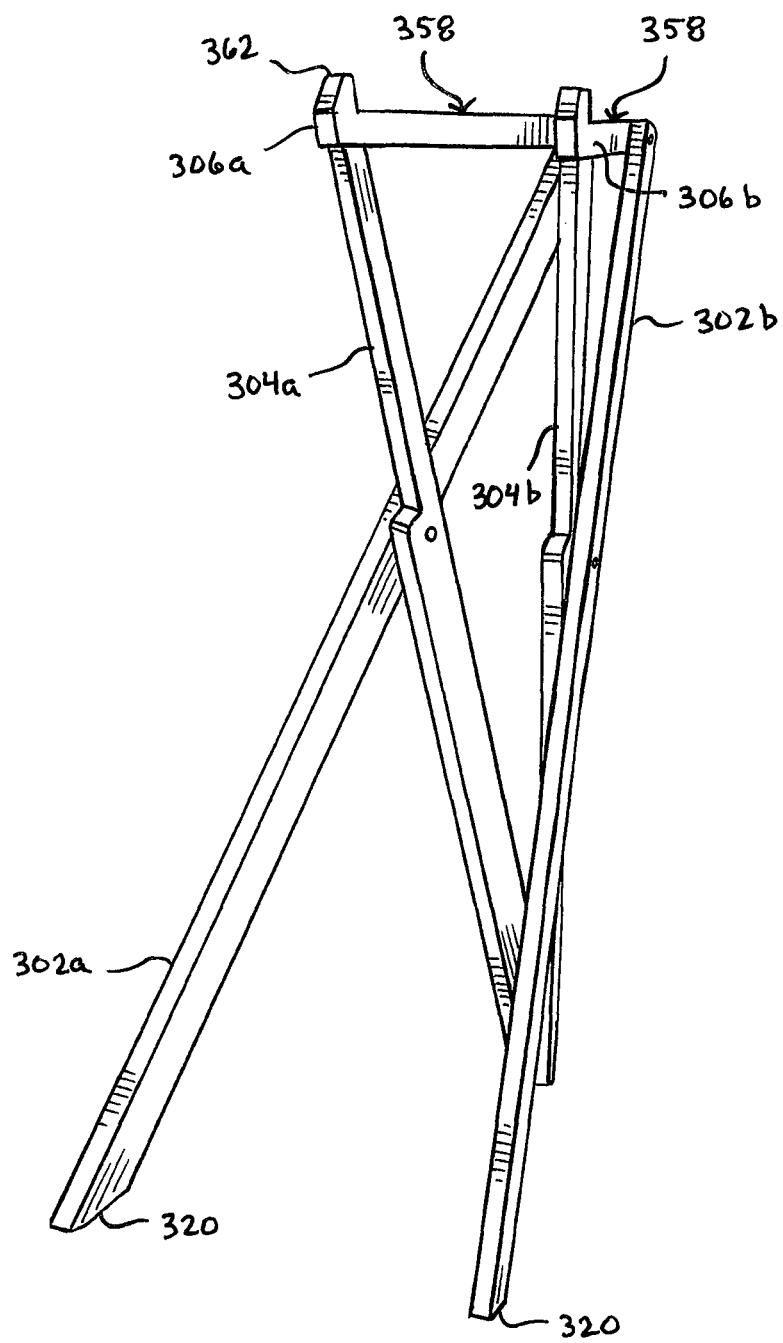
FIG. 14 is another perspective view of the embodiment of FIG. 9, showing top members fully rotatably misaligned with respect to outer members, the inner members fully rotatably misaligned with respect to outer members and fully engaged to the top members, and the outer members partially open.
Figure 15:
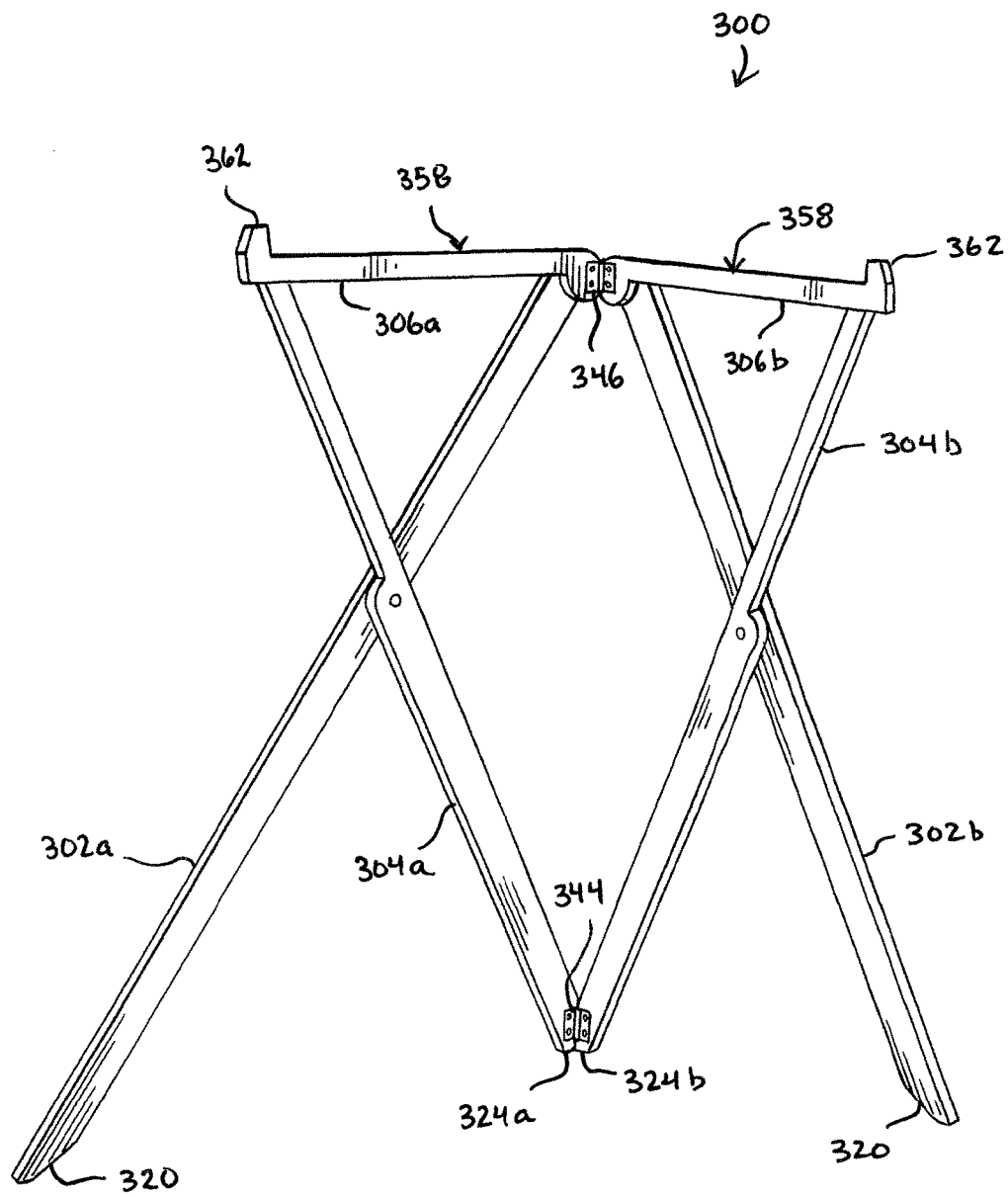
FIG. 15 is another perspective view of the embodiment of FIG. 9, showing the interretractable stand in a fully open position, with the inner members fully engaged to the top members, to provide a raised horizontal shelf for supporting an elongated structure or instrument such as an electric piano.

FIGS. 11 to 14 show the stand 300 in progressive states as it is being transitioned from the fully closed or retracted position of FIG. 9 to the fully open or extracted position of FIG. 15.

Figure 10:
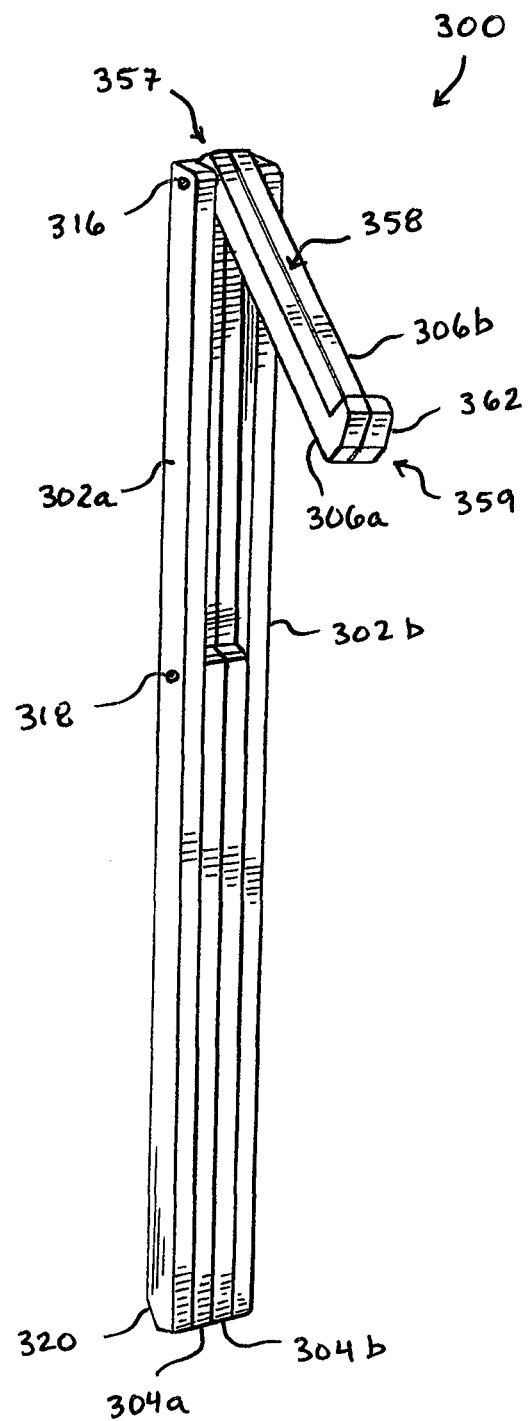
FIG. 10 is a perspective view of the embodiment of FIG. 9, showing top members being rotatably misaligned with respect to outer members.

FIG. 10 shows, in perspective, the stand 300 in a state in which its top members 306a, 306b are being rotatably misaligned with respect to outer members 302a, 302b. Each top member has a top end 357, a bottom end 359, and an elongated surface 358 extending between the top and bottom ends. Each top member 306a, 306b may be rotated about a pin that passes through the hole 316 and through a hole 360 that is defined in the top end of each top member (see FIGS. 20 and 21). A stop 362 may be formed at the bottom end of the top member, as shown. When present, the stop 362 preferably extends from the surface 358 at a right angle, however, the angle formed between surface 358 and stop 362 may be obtuse or acute. The stop 362 has dual purposes. It provides a convenient handle to allow the top member to be manually rotated to a fully aligned (retracted) or fully misaligned (extracted) position. It also provides a barrier for stopping or abutting an object that is placed onto the surfaces 358 when the stand 300 is fully open and the inner members 304a, 304b are engaged, respectively, to top members 306a, 306b as will be further explained below.

Figure 11:
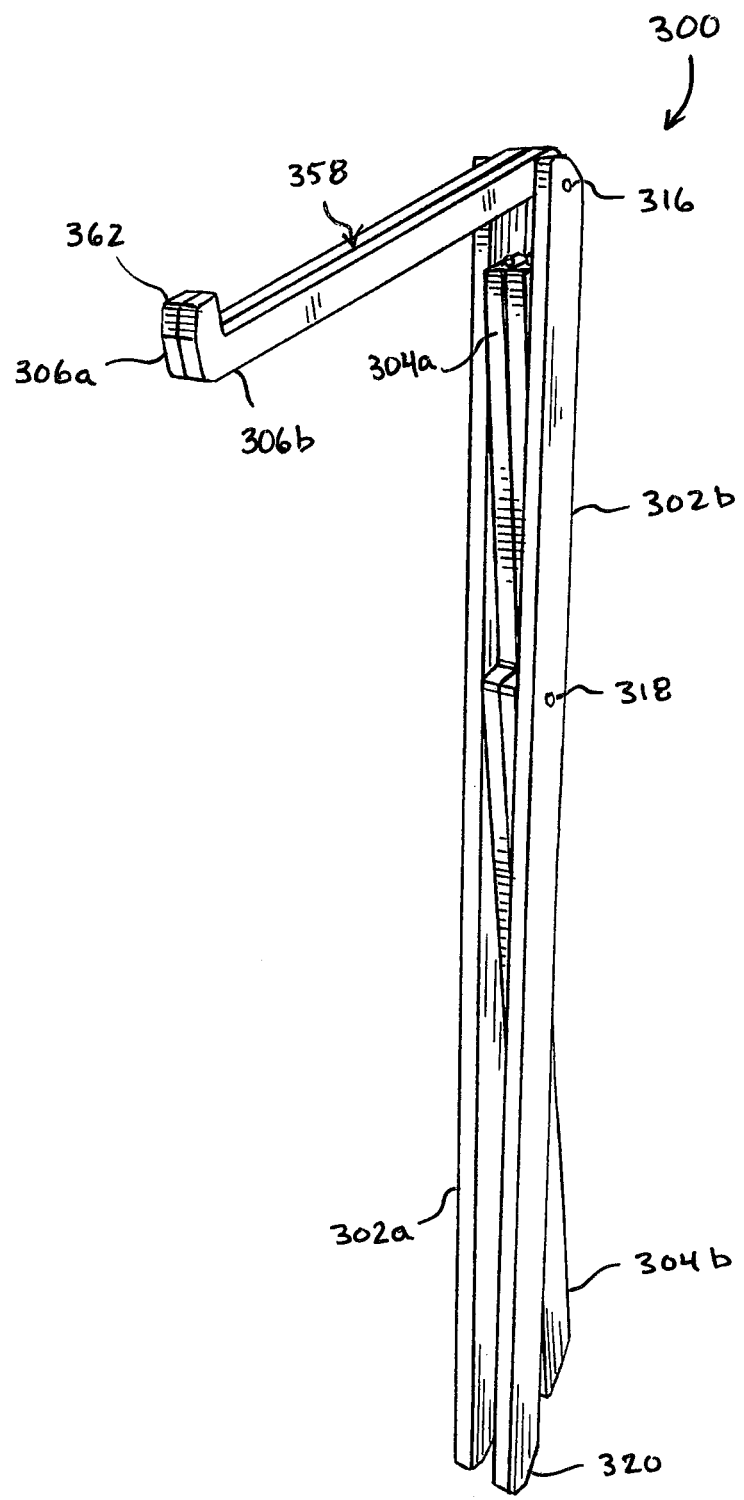
FIG. 11 is another perspective view of the embodiment of FIG. 9, showing top members fully rotatably misaligned with respect to outer members, and the inner members beginning to be rotatably misaligned with respect to outer members.

FIG. 11 shows, in perspective, the stand 300 in a state in which its top members 306a, 306b are fully rotatably misaligned with respect to outer members 302a, 302b. In the fully rotatably misaligned position, each top member 306a, 306b extends in a direction substantially parallel to the bottom surface 320 of the outer member 302a, 302b. This configuration allows the top members to provide an elevated horizontal surface when the surfaces 320 of the outer members rest on horizontal ground (see FIGS. 14 and 15). Also shown in FIG. 11 are the inner members 304a, 304b beginning to be rotatably misaligned with respect to the outer members. Each inner member 304a, 304b may be rotated about a pin that passes through the hole 318 and through a hole 364 that is defined through the inner member approximately midway between its top and bottom ends (see FIGS. 18 and 19).

Figure 12:
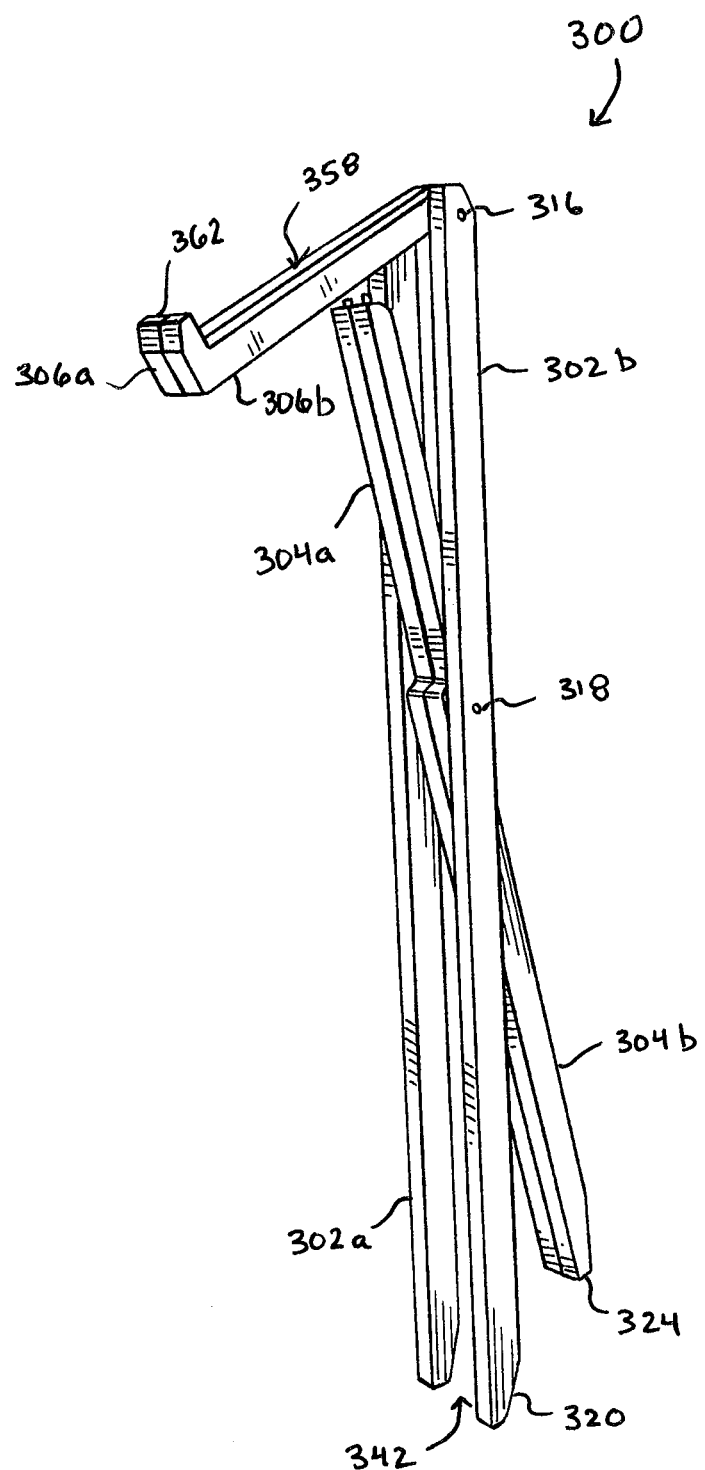
FIG. 12 is another perspective view of the embodiment of FIG. 9, showing top members fully rotatably misaligned with respect to outer members, and the inner members partially rotatably misaligned with respect to outer members.

FIG. 12 shows, in perspective, the stand 300 in a state in which its top members 306a, 306b are fully rotatably misaligned with respect to outer members 302a, 302b, and in which its inner members 304a, 304b are partially rotatably misaligned with respect to the outer members. Accordingly, this view reveals channel 342 between outer members 302a, 302b into which inner members 304a, 304b and top members 306a, 306b retract. This view also reveals a means for engaging the inner members 304a, 304b to their respective top members 306a, 306b, in the form of a pin 366 that protrudes from the top surface of each inner member (see also FIGS. 18 and 19). Each pin 366 has a shape, e.g. a length and diameter, sized to fit a complimentary receiving hole 368 defined on the underside of the distal end of each top member 306a, 306b (see FIGS. 20 and 21). The pin 366 and receiving hole 368 should be configured for easy releaseable engagement when the stand 300 is operated manually. Skilled artisans will recognize that the combination of pin 366 and receiving hole 388 form one means for engaging an inner member to a top member when both members are rotated to a fully extracted position. Conventional fastening hardware, clamps, hook-and-loop fasteners, and magnets are examples of other such means. Preferably, the means for engaging an inner member to a top member is a manually removably engageable means.

FIG. 13 shows another perspective view of the stand 300. In this view the stand 300 is in a state in which its top members 306a, 306b are fully rotatably misaligned with respect to outer members 302a, 302b. Also, the inner members 304a, 304b are fully rotatably misaligned with respect to the outer members, and the inner members are on the verge of engagement to the top members. According to the invention, when stand 300 is in this state, each top member may complete the engagement to its respective inner member by rotating slightly toward the top surface of the inner member to enclose pin 366 within hole 368. Also in this state, stand 300 is positioned to be hinged open.

FIG. 14 shows another perspective view, to illustrate stand 300 in further transition from the fully retracted position to the fully open position. Here, the top members 306a, 306b are fully rotatably misaligned with respect to outer members 302a, 302b, the inner members 304a, 304b are fully rotatably misaligned with respect to the outer members and fully engaged to the top members, and the outer members 302a, 302b are partially hinged open. As in previously described embodiments, the inner members and the top members cannot be rotated about their respective hinges 344 and 346 unless both the top members and inner members are fully rotatably misaligned with respect to the outer members such that the hinges 344 and 346 align along a common axis.

FIG. 15 is a perspective view that shows the interretractable stand 300 in a fully open position. In the fully open position, the configuration of stand 300 is the same as shown and described in FIG. 14, except that the stand has been rotated about its hinges 344 and 346 as far as possible, that is, until the top ends 357 of top members 306a, 306b abut one another behind the plates of hinge 346, or until flat foot portions 324a, 324b of inner members 304a, 304b abut one another behind the plates of hinge 344. In a preferred embodiment, these abutments occur concurrently at a hinge angle of approximately 90 degrees. Other embodiments are possible wherein the fully open position occurs at a hinge angle anywhere between zero and 180 degrees. Hinges 344 and 346 may be conventional hinges that join, respectively, inner member 304a to inner member 304b at their bottom ends, and top member 306a to top member 306b at their top ends, as shown. When stand 300 is hinged to the fully open position, flat foot portions 320, 324a, and 324b can rest atop a horizontal surface, forming three feet of a tripod that provides reliable support for the stand. Also in this position, top surfaces 358 are aligned horizontally while being supported by the outer and inner members. The top members thus provide a raised horizontal shelf for supporting an elongated structure or instrument such as an electric piano that can rest across both top surfaces 358, and also against the stops 362 if desired.

FIGS. 16 and 17 show, respectively, right and left side perspective views of an outer member 302 of the interretractable stand 300. Because the outer members may be mirror-image members, outer member 302 represents either outer member 302a or 302b. Outer member 302 is preferably formed from a single piece of rigid material. For example, it may be formed from wood, metal, plastic, or a composite material, and suitably scaled or dimensioned to support whatever load may be desired.

Figure 18:
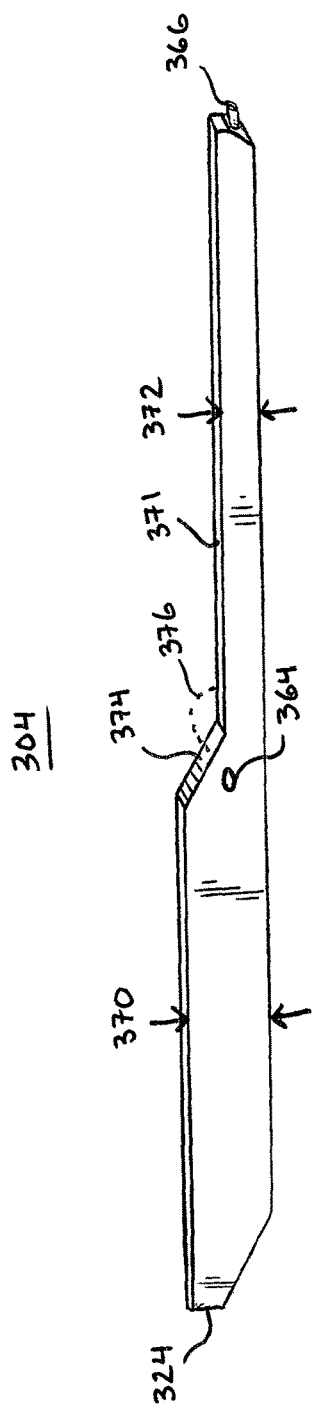
FIG. 18 is a right side perspective view of an inner member of the embodiment of FIG. 9.
Figure 19:
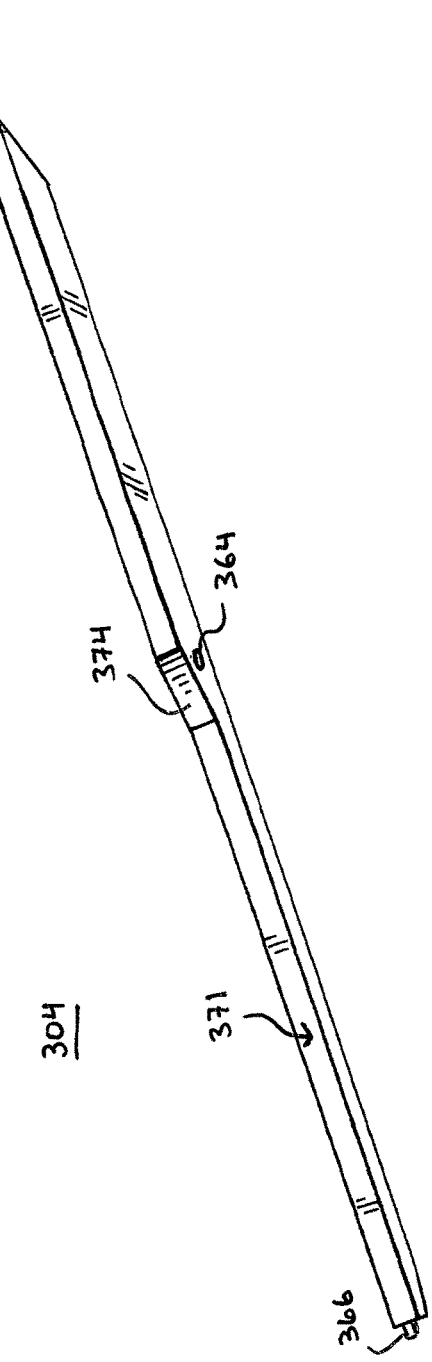
FIG. 19 is a left side perspective view of an inner member of the embodiment of FIG. 9.

FIGS. 18 and 19 show, respectively, right and left side perspective views of an inner member 304 of the interretractable stand 300. Because the inner members may be mirror-image members, inner member 304 represents either inner member 304a, 304b. Inner member 304 may be composed of the same or similar materials of construction as outer member 302. Pin 366 may be a separate part, such as a stud or dowel, that is fixed to an end of the inner member, for example, by glue or threaded connection within a properly sized mounting hole. In one embodiment, inner member 304 has a first width 370 along a lower portion of its length, and a second width 372 along a higher portion of its length. The lower portion of its length is the portion that terminates at flat foot portion 324. The higher portion of its length is the portion that terminates at pin 366. The second width 372 may be less than the first width 370. For example, in a preferred embodiment, the second width 372 is about half as wide as the first width 370. In another preferred embodiment, the difference between the second width 372 and the first width 370 is substantially identical to the width of a top member 306, and the longitudinal run of the second width 372 is substantially identical to the length of the top member 306, so that a top member 306 when fully rotatably aligned with (or retracted between) the outer members may overlap an inner member to fill the space adjacent to the surface 371 and between the outer members 302a, 302b, as shown in FIGS. 9 and 10. In one embodiment, the first width 370 runs about halfway along the length of the inner member 304. In another embodiment, the first width 370 runs about two-thirds of the way along the length of the inner member 304. Many other ratios of first width to second width, whether ratios of width, or running length of the width, are possible within the scope of the invention.

In another embodiment of the invention, the inner member 304 includes an abutment 374 that occurs along an outer surface of the inner member between the first width 370 and the second width 372, as shown. Abutment 374 slants upward from the top surface 371 of second width 372 to the top surface of first width 370 at an angle 376, as shown. Angle 376 may be a right angle or an obtuse angle. Preferably, angle 376 is between about 90 degrees and about 135 degrees. Preferably, abutment 376 defines an area and angle similar to those defined by abutment 375, as described below, to facilitate retraction of top members 306a, 306b.

FIGS. 20 and 21 show, respectively, right and left side perspective views of a top member 306 of the interretractable stand 300. Because the top members may be mirror-image members, top member 306 represents either top member 306a, 306b. Top member 306 may be composed of the same or similar materials of construction as outer member 302. The left side view shows one exemplary placement of receiving hole 368 on the undersurface of the top member 306 near (e.g. within about two inches from) an abutment 375. The abutment 375 occurs at the lower end 359 and defines an area on the undersurface of stop 359. Abutment 375 is preferably configured identically to the abutment 374. Abutment 375 slants upward from the undersurface 378 of the top member 306 to the lower end 359 and defines an angle 377 with respect to the undersurface 378. Angle 377 may be a right angle or an obtuse angle. Preferably, angle 377 is between about 90 degrees and about 135 degrees. Preferably, angle 377 matches angle 376 so that when the top member 306 is retracted between outer members 302a, 302b to a fully retracted position, abutment 375 abuts against substantially the entire surface of abutment 374, and only the stops 362 protrude from the retraction channel 342.

Figure 22:
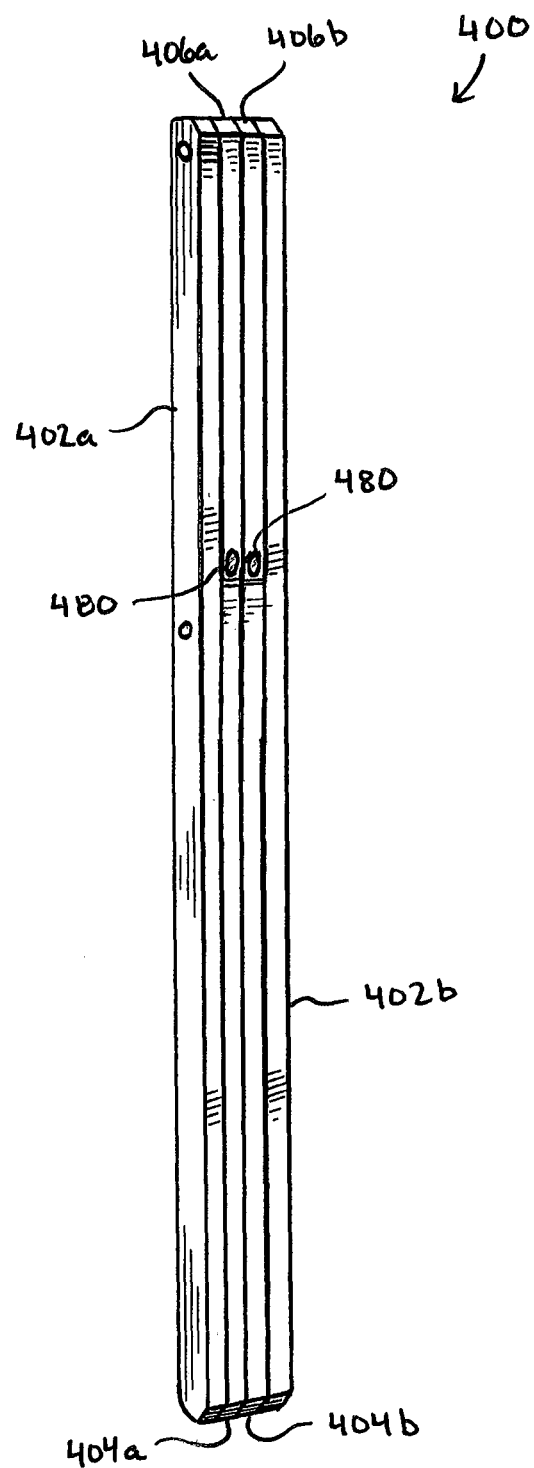
FIG. 22 is a perspective view of another embodiment of an interretractable folding stand according to the invention shown in a fully retracted position, and configured to provide a raised horizontal shelf for supporting an elongated structure or instrument such as an electric piano.

FIG. 22 shows a perspective view of an embodiment of an interretractable stand 400 in a fully closed or fully retracted position. Stand 400 is identical in all respects to stand 300, with one notable exception: The optional stops 362 of stand 300 have been removed and replaced with finger holes 480. A finger hole 480 is defined in the lower end of each top member 406a, 406b. The finger hole may be defined entirely or partially through the top member. The finger holes 480 provide an alternative means for grasping the top members to facilitate rotating them outward to misalignment with respect to outer members 402a, 402b. Advantageously, the replacement of stops 362 with finger holes 480 minimizes the fully closed volume of the stand 400 by allowing all members (outer members 402a, 402b, inner members 404a, 404b, and top members 406a, 406b) to be interretracted to form an elongated, substantially rectangular volume, without having any components (such as stops 362) protrude outside that volume. Otherwise, stand 400 operates identically as stand 300.

In view of the foregoing description, it should be understood that embodiments of the invention such as stand 300 and stand 400 may include outer, inner, and top pairs of mirror-image members, with each member of the outer pair rotatably connected to a member of the inner pair and rotatably connected to a member of the top pair. The members of the inner pair are hingedly connected by a first hinge, and the members of the top pair are hingedly connected by a second hinge, so that when the inner pair and top pair are fully rotatably misaligned with respect to the outer pair, the first and second hinges lie along a common access to allow the outer, inner and top pairs to be hingedly separated to an open position. In the closed position, the members of the outer pair are aligned in parallel and offset to form a retraction channel. The inner pair and top pair when fully rotatably aligned with respect to the outer pair rests in the retraction channel between members of the outer pair in a closed position.

Stand 300 and stand 400 are also characterized as consisting of mirror image outer, inner and top members, wherein each of said members consists essentially of a straight elongated rigid board. According to the invention, the term elongated means that each member substantially consists of a rectangular board having a length greater than four times its width. In other embodiments, the each elongated member may have a length at least six times its width. Stand 300 and stand 400 are further characterized as being retractable into a substantially rectangular volume. Both stands may also be characterized in that each inner member has first and second widths, sized such that the first width is equal to or greater than the sum of the second width and the width of a top member. This feature allows the inner members and top members to overlap when rotatably aligned with respect to the outer members, such that the inner members and top members lie within a rectangular retraction channel formed between the outer members.

Exemplary embodiments of the invention have been disclosed in an illustrative style. Accordingly, the terminology employed throughout should be read in an exemplary rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An interretractable stand, comprising:
    outer and inner pairs of mirror-image members;
    each member of the outer pair rotatably connected to a member of the inner pair;
    the members of the outer pair hingedly connected, and the members of the inner pair hingedly connected, so that the inner pair when fully rotatably misaligned with respect to the outer pair allows the inner and outer pairs to be hingedly separated to an open position, and so that the inner pair when fully rotatably aligned with respect to the outer pair rests between members of the outer pair in a closed position;
    a top pair of mirror-image members, each member of the top pair rotatably connected to a member of the outer pair;
    the members of the top pair hingedly connected, so that the top pair, when fully rotated from a closed position between the members of the outer pair to a fully extracted position, allows the top, inner and outer pairs to be hingedly separated to the open position, the members of the outer pair being hingedly connected by means of a hinge connecting the members of the top pair and hingedly separable only when the top pair is in the fully extracted position; and
    a means for engaging an inner member to a top member.

2. The interretractable stand of claim 1 wherein, in the open position, the members of the inner pair form a first foot of a tripod and the members of the outer pair form second and third feet of the tripod.

3. The interretractable stand of claim 1 wherein, in the closed position, the members of the outer pair form a channel enclosing the inner pair.

4. The interretractable stand of claim 3 further comprising a means for manually extracting a top member from the channel.

5. The interretractable stand of claim 4 wherein the manually extracting means comprises a stop configured to prevent horizontal movement of a load along the top members when the stand is fully open and when the inner members are engaged to the top members.

6. The interretractable stand of claim 1 further comprising:
    a first hinge connecting the members of the top pair; and
    a second hinge connecting the members of the inner pair;
    wherein, in the open position the first and second hinges cooperate; and
    wherein, in the closed position, the first and second hinges cannot operate.

7. The interretractable stand of claim 1 wherein the engaging means connects a top end of an inner member to a lower end of a top member.

8. The interretractable stand of claim 7, wherein the engaging means is configured so that the engaging means connects the top end of the inner member to the lower end of the top member when the inner and top members are both fully extracted.

9. The interretractable stand of claim 1, wherein the top members, the inner members, and the outer members are configured so that when the stand is placed into an open position, the top members are supported by the inner and outer members so that the top members provide a raised horizontal shelf.

10. The interretractable stand of claim 1 wherein the hinge connecting the members of the top pair comprises a first hinge, wherein the members of the inner pair are hingedly connected by a second hinge, and wherein the stand is configured so that when the top pair is fully rotatably misaligned with respect the outer pair, the first and second hinges align along a common axis.

11. An interretractable stand, comprising:
outer, inner, and top pairs of mirror-image members;
each member of the outer pair rotatably connected to a member of the inner pair and to a member of the top pair; and
the members of the top pair hingedly connected, and the members of the inner pair hingedly connected, so that the inner and top pairs when fully rotated from a closed position between the members of the outer pair to an extracted position, allow the outer, inner, and top pairs to be hingedly separated to an open position, and so that the inner and top pairs when fully rotated to the closed position align with the members of the outer pair; and
a means for engaging an inner member to a top member.

12. The interretractable stand of claim 11 wherein, in the open position, the members of the inner pair form a first foot of a tripod and the members of the outer pair form second and third feet of the tripod.

13. The interretractable stand of claim 11, wherein, the engaging means connects a top end of an inner member to a lower end of a top member.

14. The interretractable stand of claim 13 wherein the top members, the inner members, and the outer members are configured so that when the stand is placed into an open position, the top members are supported by the inner and outer members so that the top members provide a raised horizontal shelf.

15. An interretractable stand comprising
outer, inner, and top pairs of mirror-image members, and
a means for engaging each inner member to a top member;
wherein each member of the outer pair is rotatably connected to a member of the inner pair,
wherein the members of the outer pair are hingedly connected by a first hinge connecting the members of the top pair,
wherein the members of the inner pair are hingedly connected by a second hinge, and
wherein the stand is configured so that when the top pair and inner pair are fully rotatably misaligned with respect the outer pair, the first and second hinges align along a common axis thereby allowing hinged separation of the inner and top pairs to allow engagement of each inner member to a top member by the engagement means.

16. The interretractable stand of claim 15 wherein the engaging means connects a top end of an inner member to a lower end of a top member.

17. The interretractable stand of claim 15 configured so that when the stand is placed into an open position, the top members are supported by the inner and outer members and provide a raised horizontal shelf.

18. The interretractable stand of claim 15 configured so that the inner pair when fully rotatably aligned with respect to the outer pair rests between members of the outer pair in a closed position in which the members of the outer pair form a channel enclosing the inner pair.

19. The interretractable stand of claim 18 further comprising a means for manually extracting a top member from the channel.

20. The interretractable stand of claim 19 wherein the manually extracting means comprises a stop configured to prevent horizontal movement of a load along the top members when the stand is fully open and when the inner members are engaged to the top members.

* * * * *